Nov. 16, 1943.  J. E. SOCKE  2,334,225
LEVER OPENING CONTAINER
Filed Dec. 10, 1941
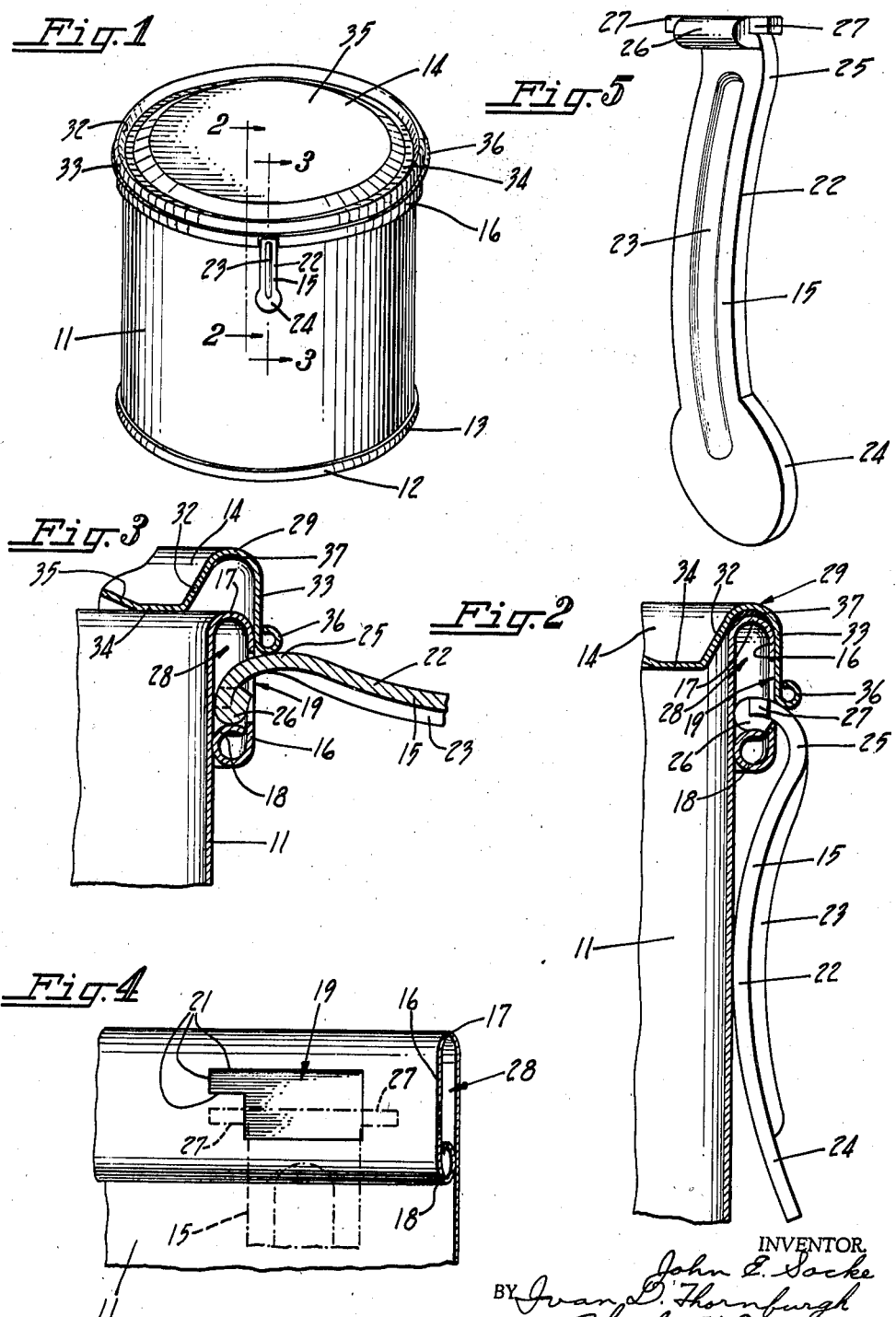
INVENTOR.
John E. Socke
BY Ivan D. Thornburgh
Charles H. Erne
ATTORNEYS.

UNITED STATES PATENT OFFICE 2,334,225

LEVER OPENING CONTAINER

John E. Socke, Pelham Manor, N. Y., assignor to American Can Company, New York, N. Y., a corporation of New Jersey Application December 10, 1941, Serial No. 422,429

4 Claims. (Cl. 220—43)

This invention relates to a metallic can or container having a drawn outside can wall surrounding an open end thereof and has particular reference to a preformed opening in the outer wall wherein a pry opening lever is positioned for prying off a lid or cover.

The present invention contemplates the provision of a lever type opener that is simple and inexpensive to manufacture and which is disposed in an opening formed in an integral outer spaced body wall extending from a smooth uninterrupted mouth edge of a receptacle, a gasket lined cover being seated upon the receptacle and sealing the same, the cover being removable by a simple prying or lifting action of the lever.

An object of the invention is the provision of a container opener of the lever type for the removal of slip covers from their closed or seated position on a smooth edge of a container, the latter having an outwardly drawn and spaced depending integral can wall section or collar bordering the edge and terminating in a curl and having an opening cut in the collar section for hingedly positioning the pry opening lever, wherein it remains connected with the container without interfering with the air-tight or hermetic sealing of the container but is adapted for instant use by engagement beneath the curled cover flange so that an upward lifting or prying movement of the lever raises the cover from its closed position.

Another object of the invention is the provision in a container of the character described having an opening, substantially T-shaped in one side, cut in the material of the outer wall section prior to the formation of the tubular body and its spaced collar, wherein the opening lever can be assembled easily and without great accuracy to fulcrum upon an inwardly extending wall section or inwardly extending curled wall part located at the terminal edge of the spaced collar. Said lever is also designed to fulcrum against the inner body wall or against the inner surface of the spaced collar so that the handle end of the lever projecting outwardly beneath the curled edge on the cover may be lifted up for prying off the cover.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a closed container having a pry opening lever embodying the present invention;

Fig. 2 is an enlarged fragmentary view in vertical section of the container shown in Fig. 1 taken substantially along the broken line 2—2 of said figure and showing the lever opener in an inoperative position;

Fig. 3 is a view similar to Fig. 2 taken substantially along the line 3—3 in Fig. 1 and showing the lever in an operative position to pry off the cover;

Fig. 4 is an enlarged fragmentary detail in side elevation of the upper edge of the container showing an opening cut in the outer spaced collar; and Fig. 5 is an enlarged perspective view of the pry opening lever prior to being positioned into an opening such as shown in Fig. 4.

As a preferred embodiment of the invention, Fig. 1 of the drawing illustrates a metallic can or container 11 having a bottom end 12 which is united with the body in the usual double seam 13. The upper end of the body is closed by a slip cover 14 which is removed easily by a pry opening lever 15.

The container body 11 after being formed into a tubular body in the conventional manner, is subjected to a pressure drawing action wherein a spaced outer drawn can wall section or collar 16 is provided (Figs. 2 and 3). Such a collar surrounds the upper end of the can and forms a full open mouth having a rigid rim or edge which is smooth and rounded as at 17. The lower edge of the drawn collar terminates in an inwardly extending wall section which as herein shown constitutes an inwardly extending edge curl 18. This produces a uniformly spaced and sized outer friction wall for the reception of the cover 14.

The collar 16 has an opening 19 (Fig. 4) which preferably is pierced or cut in the body material prior to forming the body into its tubular shape. The general contour of the opening is rectangular with a modified corner which is formed with a slotted T-shaped outline along one side as at 21. This provides a slotted extension of sufficient dimension at the upper region on one side thereof for assembling the pry opening lever 14 to the container and will be described hereinafter more fully.

The lever 15 (Fig. 5) also is formed from metallic material which is of heavier stock than the container proper. The lever has a main body part 22 a portion of which is embossed or ribbed as at 23 and is formed with a rounded finger engaging portion 24 at one end. The body part 22 merges into a curved section 25 and this portion of the lever serves as a slidable cam surface engageable against the cover rim during an opening operation. At the other end, the body terminates in a hemmed edge 26 which outlines a cylindrical pivot for the lever. This end has lateral projections or lugs 27, one being extended on each side to provide a pivotal support for the lever when attached to the container collar.

The lever is assembled in the opening 19 of the container by inserting the projection 27 on the right hand side of the lever (Fig. 4) into the space between the body wall and the collar 16. This space is designated by the numeral 28. When thus initially inserted the lever is moved to the right and then upwardly against the upper edge of the opening. The projection 27 on the left hand side of the lever then may be inserted in the slotted extension and into the space 28 for hinging engagement behind the collar. The lever thereafter is free to drop into the rectangular part of the opening 19 with the body and handle in a normal inoperative position resting against the body wall of the container (Figs. 1 and 2).

The cover 14 has an annular channel 29 which merges into an inward and downward slopping wall 32 and into an outer depending friction wall 33. The wall 32 merges into an annular countersunk section 34 the center of which is bulged outwardly in a central panel 35. The outer wall 33 of the cover terminates in an outer edge curl 36.

The channel 29 has a liquid lining compound or gasket 37 deposited therein. Such a gasket effects a hermetic seal between the can edge 17 and the cover wall of the channel 29 when the cover is positioned on the container (Fig. 2). With this type of construction the container may be sealed tightly while the pry opening lever is attached hingedly to the collar where it is disposed at the side of the body ready for instant use for lifting or prying off the cover.

The inwardly extending wall or edge curl 18 of the collar provides a fulcrum for the cover removing lever 15. The cylindrical pivot formed by the hemmed edge 26 at the terminus of the curved portion 25 on the short arm of the lever engages against the edge curl 18 in the space 28 as the curved part of the lever projects outwardly beneath the cover curl 36. The projections 27 on the lever engage against the inner surface of the collar wall 16 when the lever 15 is lifted initially for the opening.

In the opening operation the finger piece 24 of the lever first is engaged and then is raised during which time the opposite end of the lever shifts on the edge curl 18 and engages against the outer surface of the container body (Fig. 3). The space 28 is of such dimension that a loose pivotal action is obtained. This results in lifting the outer wall 33 of the cover clear of the collar 16 on the side of the opening 19. Thereupon the cover may be removed fully from the container by the fingers.

The lever will remain attached to the container at all times unless removed manually and will not interfere in any way with the removal of the contents or with the replacement of the cover. Such a cover thereafter serves as a suitable reclosure which can be used many times for effective resealing purposes.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container having a removable cover and an opening device, comprising in combination, a tubular body, a collar formed integrally with said body and extending in spaced relation around the body wall adjacent an end thereof, said collar having an opening and having its terminal edge formed with an inwardly extending wall section disposed substantially in engagement with said body wall, a removable cover fitting over said collar, and a lever hingedly disposed in the opening of said collar, said inwardly extending wall section serving as a fulcrum for said lever when the lever is used for prying off said cover.

2. A container having a removable cover and an opening device, comprising in combination, a tubular sheet metal body, a collar formed integrally with said body and extending around the body wall in spaced relation at an end thereof, the terminal edge of said collar having an inwardly extending edge curl disposed substantially in contact with said body wall, the said collar having an opening therein, a removable sheet metal cover fitting over said collar, and a pry-off lever hingedly disposed in the opening of said collar and bearing on said edge curl as a fulcrum for prying off said cover when said lever is lifted on its hinged connection.

3. A container having a removable cover and an opening device, comprising in combination, a tubular body, a collar formed integrally with said body and extending in spaced relation around the body wall adjacent an end thereof, an inwardly extending curled wall section on the terminal edge of said collar and constituting an edge curl, said collar having a rectangular opening and having a slot extending from one side of the opening, a removable gasket lined cover fitting over said collar for hermetically sealing the container, and a lever having laterally extending hinge lugs insertable into the collar opening by way of said slot and engageable behind the collar when the lever is lifted for prying off said cover by a hinging movement within said collar with the inwardly extending edge curl serving as a fulcrum point for the lever.

4. A container having a removable cover and an opening device, comprising in combination, a tubular body, a collar formed integrally with said body and extending in spaced relation around the body wall adjacent an end thereof, said collar terminating in an inwardly extending edge curl and having an opening in the collar wall, a removable cover fitting over said collar and having an annular channel containing a gasket lining for sealing the container, a lever having laterally extending hinge lugs insertable into said opening to provide a hinging movement between said tubular body and said collar when said lever is hinged outwardly and upwardly in prying off the cover, and a cylindrical pivot member formed as an integral part of said lever adjacent its hinge lugs for engagement with said edge curl whereby a smooth rocking action is obtained for said lever as it is moved into and out of cover prying position.

JOHN E. SOCKE.